United States Patent

Lesher et al.

[11] Patent Number: 5,203,154
[45] Date of Patent: Apr. 20, 1993

[54] HAY RAKE AND MERGER

[76] Inventors: Glenn A. Lesher, R.D. #1, Box 302, Bernville, Pa. 19506; Lee A. Schlappich, R.D. #2 Box 436, Mohrsville, Pa. 19541

[21] Appl. No.: 762,544

[22] Filed: Sep. 18, 1991

[51] Int. Cl.[5] .................. A01D 78/00; A01D 78/10
[52] U.S. Cl. ................................. 56/366; 56/370; 56/372; 56/DIG. 21
[58] Field of Search ............. 56/15.1, 15.5, 15.8, 56/16.3, 365, 366, 370, 376, DIG. 21

[56] References Cited

U.S. PATENT DOCUMENTS

| | | | |
|---|---|---|---|
| 2,629,223 | 2/1953 | Russell | 56/376 |
| 2,636,335 | 4/1953 | Whitney | 56/370 |
| 2,718,746 | 9/1955 | Prischmann | 56/372 |
| 2,741,892 | 4/1956 | Collette | 56/372 |
| 2,761,270 | 9/1956 | Blaser et al. | 56/DIG. 21 |
| 3,141,284 | 7/1964 | Reynolds | 56/354 |
| 3,221,484 | 12/1965 | Van Der Lely | 56/370 |
| 3,702,052 | 11/1972 | Klassen | 56/370 |
| 3,721,080 | 3/1973 | Marsh | 56/364 |
| 3,884,022 | 5/1975 | Landolt | 56/364 |
| 4,403,468 | 9/1983 | Yoder | 56/370 |
| 4,723,401 | 2/1988 | Webster et al. | 56/377 |
| 4,730,447 | 3/1988 | Fisher et al. | 56/377 |
| 4,738,092 | 4/1988 | Jennings | 56/372 |
| 4,910,951 | 3/1990 | Reilly et al. | 56/376 |
| 5,025,616 | 6/1991 | Moss | 56/15.1 X |

FOREIGN PATENT DOCUMENTS 1310648 10/1962 France ................. 56/DIG. 21

Primary Examiner—David J. Bagnell
Attorney, Agent, or Firm—Synnestvedt & Lechner

[57] ABSTRACT

A forage crop harvester is provided with a rotary crop pick-up which deposits crop deposited in an elongated swath and deposits it on a transversely extended, moveable conveyor which consolidates the crop material and deposits it in a windrow at one side of the harvester. The pick-up is disposed on the harvester in a position in advance of the harvester wheels, thereby eliminating damage to the crop caused by crushing of the material in the swath by the wheels. The harvester includes mechanism providing for maintaining it in an offset relationship with respect to the tractor during operation. The rake and conveyor are supported through a counterbalancing mechanism which maintains it in a floating relationship in a crop pick-up position and has ground engaging skids which limit contact of the rake teeth with the ground surface.

18 Claims, 5 Drawing Sheets

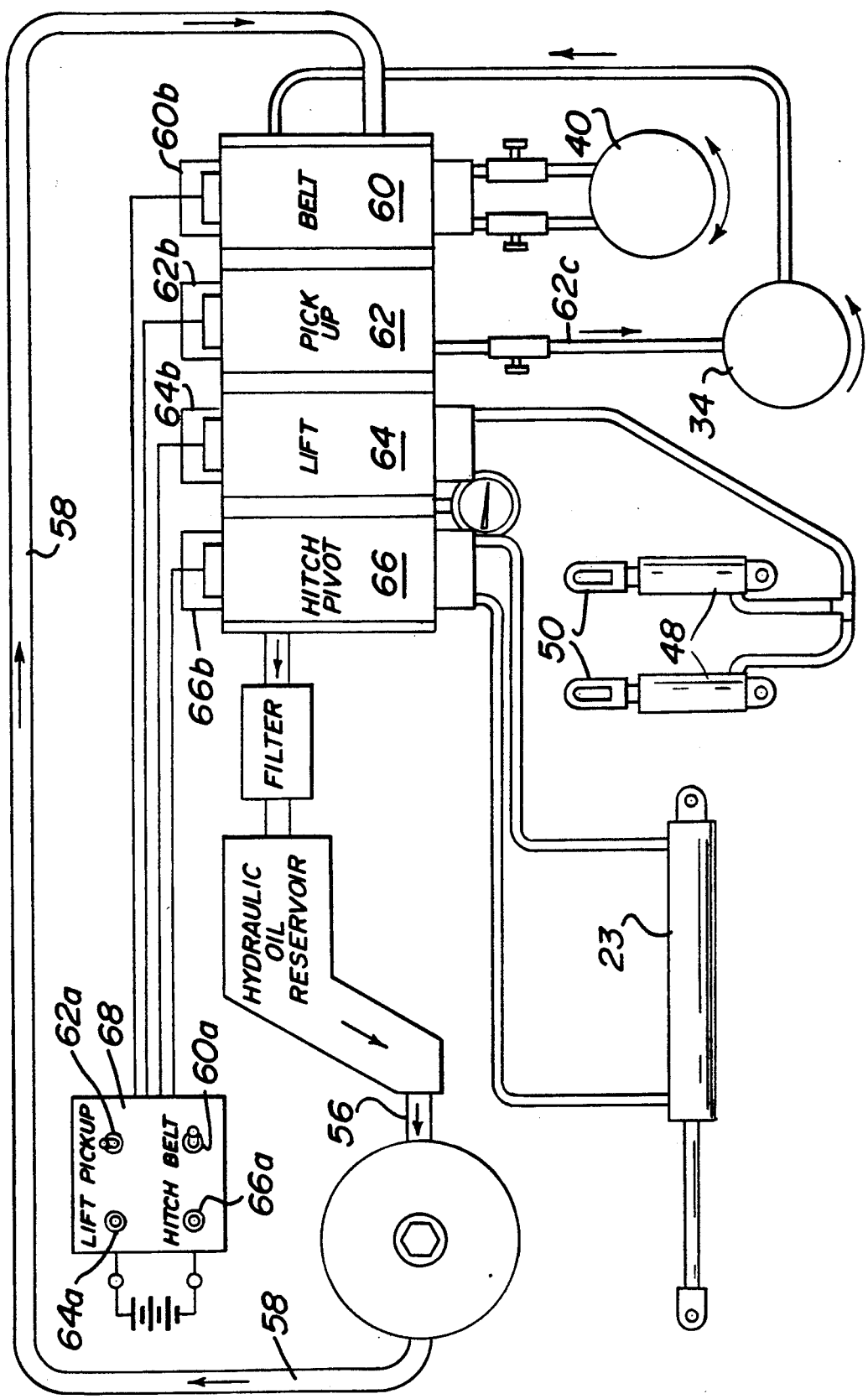

HAY RAKE AND MERGER

FIELD OF THE INVENTION

This invention relates to forage crop harvesters and, more particularly, to a rake for transforming swathed crop material into windrows preliminarily to a bailing operation.

BACKGROUND OF THE INVENTION

In the harvesting of forage crop material such as hay, the hay is cut by a swather which lays it down in swaths which are approximately 9 feet wide. Once the hay is swathed, a rake is used to collect the hay in the swath and form it into a relatively narrow row called a windrow. Typical raking equipment for this purpose comprises a plurality of horizontally extending, reciprocating bars on which tines or teeth extend vertically downwardly. The bars move the tines or teeth in paths which extend diagonally with respect to the axis of a swath and drag the hay within the swath to one side or the other, thus forming a relatively narrow, elongated row or windrow.

Although this equipment has received a high degree of acceptance over the years, there are certain problems associated with its use which the present invention has an object of solving. In use in harvesting forage crops, the equipment described has a tendency to damage the leaves of the crop material as the rake drags the crop laterally across the ground into a windrow. Further, most rakes and mergers in use today are drawn by a tractor which must drive over a part of the swath just prior to raking or merger, thereby causing further damage. Still further with existing equipment, a second windrow merger operation is further required so as to merge two windrows into one after the hay in the windrows is dry, so as to allow for pick up and processing by high capacity bailers or forage harvesters.

Known rotary rakes generally fall into two categories. Those that are drawn behind a tractor, pick up the hay and therefor avoid the damage caused by dragging it laterally across the ground into a windrow. However, crop damage still occurs when the tractor must drive on the windrow as it pulls the rake along. Those that are mounted on the front of the tractor avoid this problem but are generally unsuitable for use on bumpy terrain since the teeth of the rake being spaced forwardly of the tractor front wheels tend to dig into the ground or are raised out of contact with the hay as the tractor tilts downwardly or upwardly when its front wheels drop below or rise above grade level.

SUMMARY AND OBJECTS OF THE INVENTION

The present invention improves harvesting efficiency by the provision of equipment which reduces crop damage and has the capability of picking up a full 9 foot wide swath utilizing a rotary rack and moving the picked up crop to one side where it is gently formed into a windrow. Alternately, merger of two windrows into one and inverting may be readily accomplished. With the invention, driving over the crop is avoided, is treated gently so as to avoid destruction of the crop and is formed into a single relatively thick windrow which is double the size of ordinary windrows. Drying time is reduced and harvest efficiency is increased by forming a single swath into a windrow which is double the size of ordinary windrows.

Preferably, the foregoing is accomplished by equipment which is adapted to be drawn in offset relationship to the tractor through hydraulically operated pivotal hitch means, although certain of the objectives of the invention could be achieved by a unit mountable on the front of the tractor. The equipment comprises a rotating pick-up rake having a width at least equal to the width of a conventional swath. The pick-up rake has plural radially extending tines or teeth which pick up the swath and transfer it to a rotating transversely extending conveyor which is selectively operated to transfer the crop to one side of the swath or the other and to form it into a single, relatively dense windrow suitable for harvesting. If desired, the equipment alternately merges side by side windrows into a second, double windrow and may be provided with an invertor at either side to invert the material as it is formed into a windrow.

BRIEF DESCRIPTION OF THE DRAWINGS

FIG. 5 is a schematic representation of the hydraulic system utilized in the equipment of FIGS. 1 through 4.

DETAILED DESCRIPTION OF THE ILLUSTRATIVE BODY OF THE INVENTION

Figure 1:
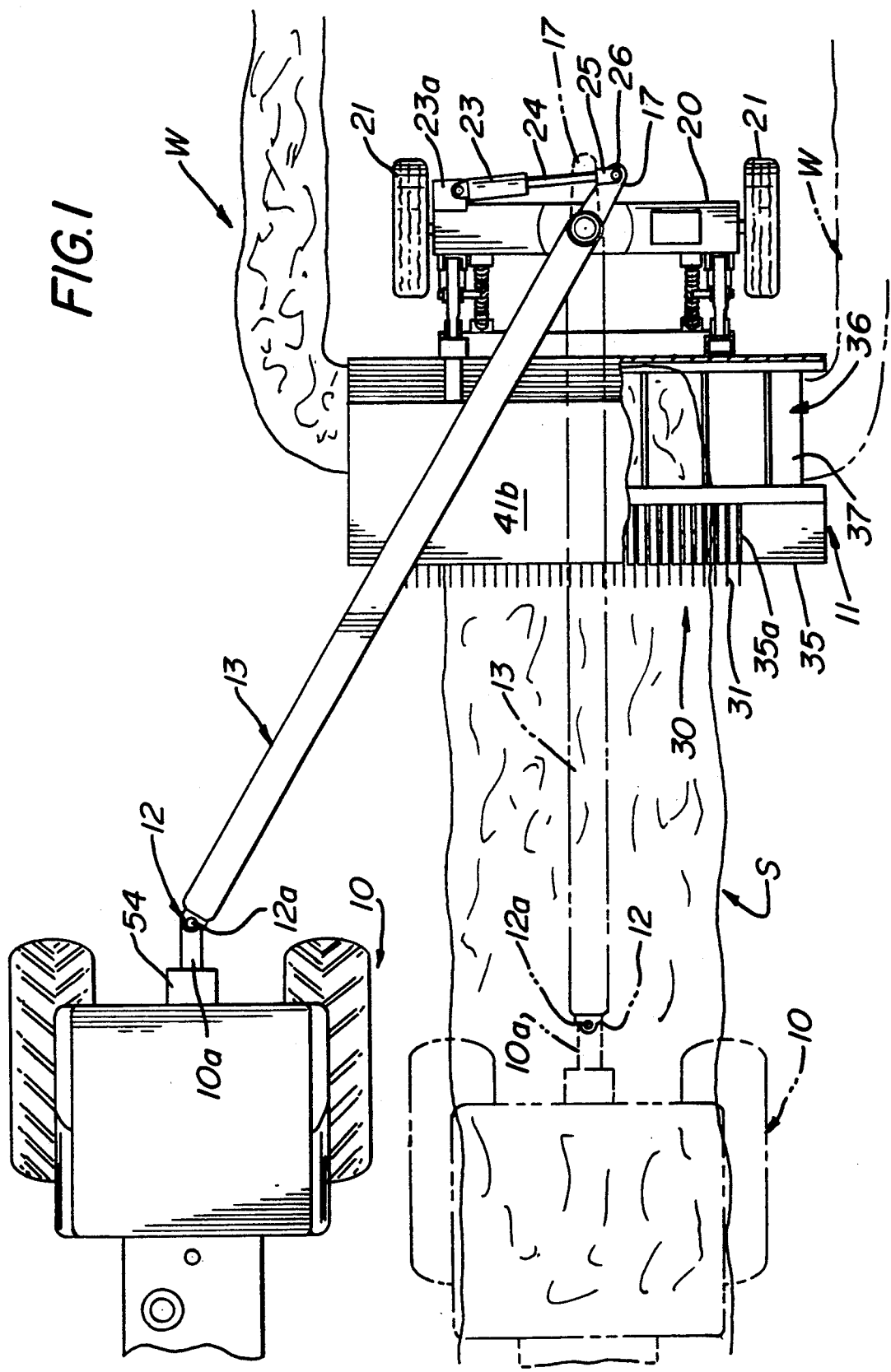
FIG. 1 is a plan view illustrating harvesting equipment formed according to the invention, both in a position in which it would be towed directly behind the tractor and in a laterally offset position in which a swath is raked and is formed into a windrow.

Attention is first directed to FIGS. 1 through 4 and, in particular, to FIG. 1 which is a plan view illustrating a conventional farm tractor 10, towing harvesting equipment 11 formed in accordance with the present invention.

As is shown in FIG. 1, tractor 10 is provided with a hitch 10a of any suitable kind and is adapted to be coupled to a clevis or other suitable coupling portion 12 on a towing boom generally indicated at 13. Typically, matching openings on the hitch 11 and on clevis 12 receive a coupling pin 12a for connection of the hitch to the boom.

Figure 2:
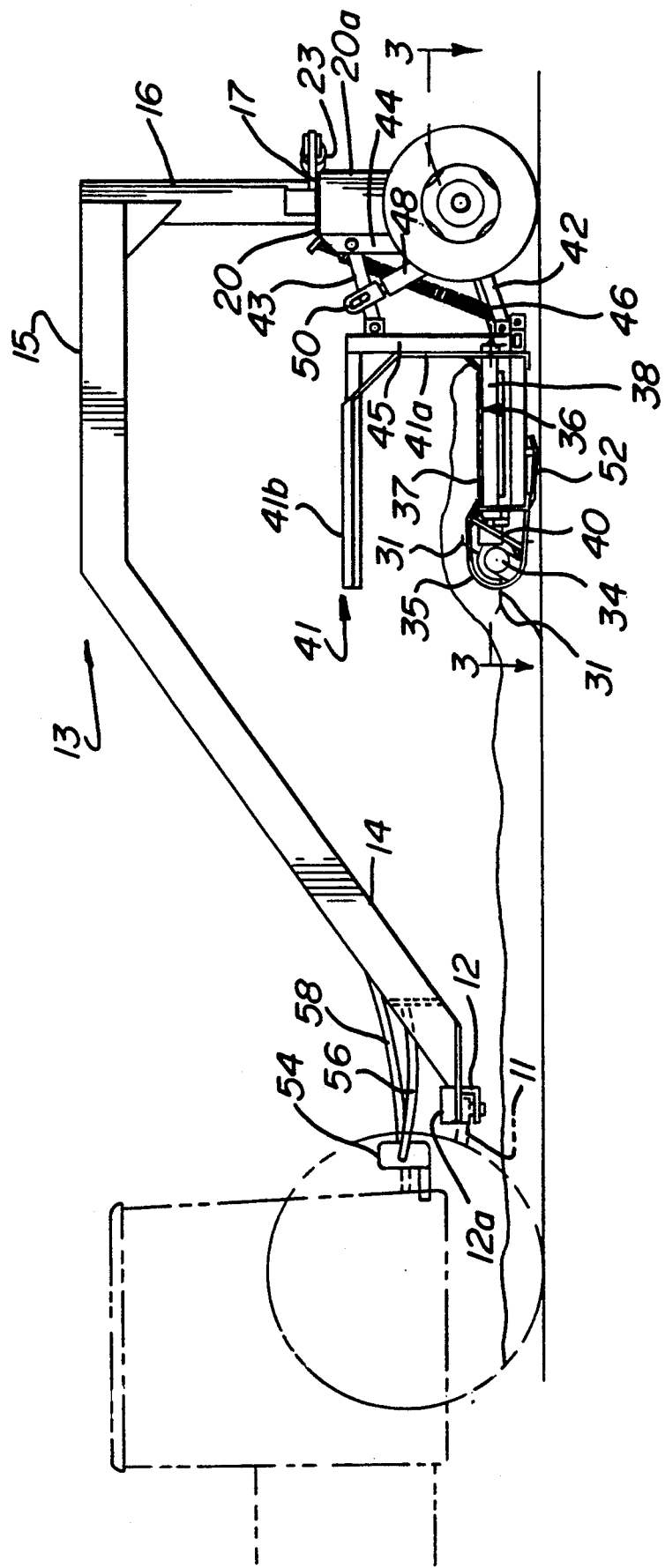
FIG. 2 is an elevational view of the harvesting equipment shown in FIG. 1.

In order to provide a connection between the tractor and the harvester rearwardly of the rack portion, towing boom 13 has an upwardly and rearwardly inclined portion 14, a substantially horizontal portion 15 and a vertically extending portion 16, as can be seen in FIG. 2. The lower end of vertically extending section 16 is provided with a horizontally projecting lever 17 which forms a portion of means to maintain the harvesting equipment 11 in a track which is offset in relation to the path followed by tractor 10, as will be described hereinafter.

Harvesting equipment 11 is provided with a first, transversely extending frame support 20 on which the vertically extending boom section 16 is pivotally mounted. The frame support further has boxlike axle supports 20a disposed at each end upon which wheels 21 are rotatably mounted. A boom cylinder 23 powered by hydraulic circuitry, as explained hereinafter, is pivotally mounted on a bracket 23a on one end of frame support 20. Cylinder 23 is of conventional construction and includes a piston and piston rod 24 which is connected to boom pivoting lever 17 by means such as a clevis 25 and clevis pin 26. As will be explained more fully hereinafter, extension of piston rod 24 caused by pressurizing boom cylinder 23 pivots boom 13 to cause the harvester 11 to be drawn by the tractor along a path which is outside of the track of the wheels of tractor 10 when the piston is fully extended.

Figure 3:
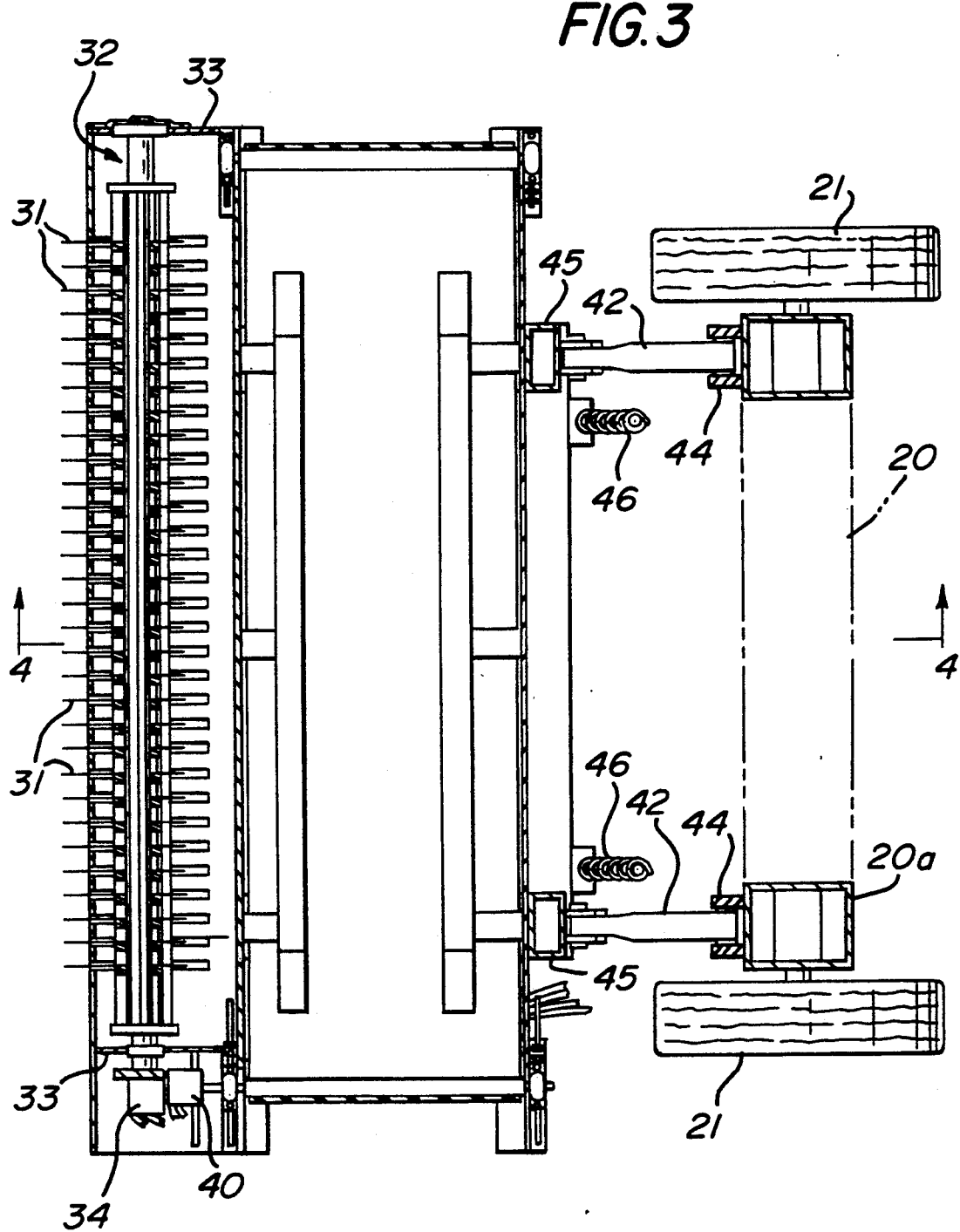
FIG. 3 is a sectional view taken along lines 3—3 of FIG. 2.

The harvester 11 further includes a rotary rake 30 comprising a plurality of laterally spaced sets tines 31 mounted on a shaft assembly 32 which is journalled in end plates 33, best seen in FIG. 3. Shaft 32 is driven by a hydraulic motor 34.

Rotary rake 30 is mounted within a shroud-like sheet metal covering or shroud 35 with tines 31 projecting radially outwardly through spaced apart slots as indicated at 35a. The upper surface of the covering or shroud 35 provides a support surface for hay picked up by tines 31, as best can be seen in FIG. 4.

Figure 4:
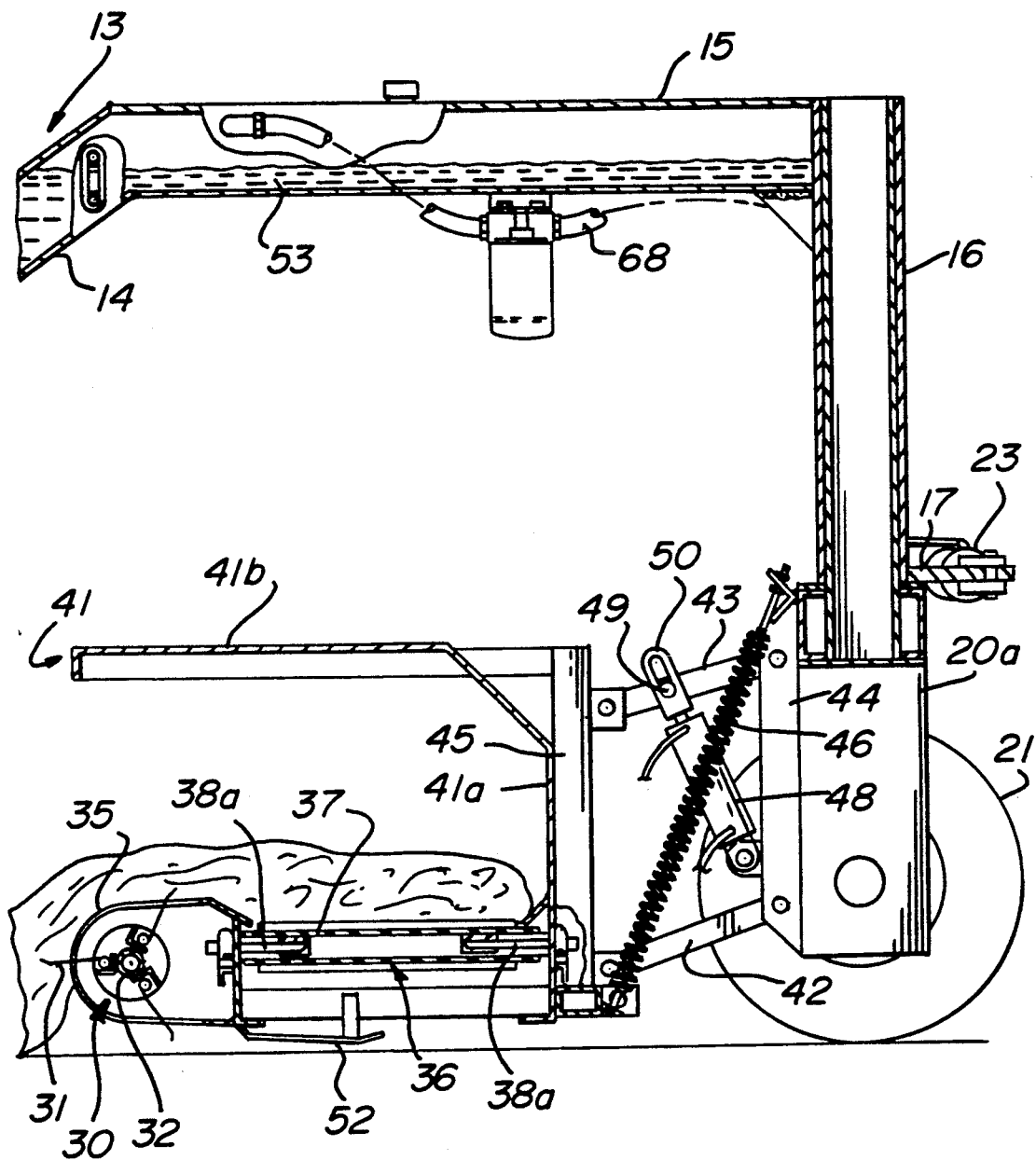
FIG. 4 is a view taken along lines 4—4 of FIG. 3.

In order to transfer the hay picked up by tines 31 in a direction transversely of the rake, a transversely extending conveyor 36 which includes a continuous belt 37, as is best shown in FIGS. 1 and 4. Conveyor 36 is of generally conventional construction, the endless belt 37 being mounted on pairs of support shafts. One support shaft is shown at 38 in FIG. 2 and is driven by a hydraulic motor 40. In a preferred form of the invention, the motor is reversible so as to selectively transfer the swath to either side of the rake, although it should be understood that important objectives of the invention can be achieved by a conveyor drive which has the capability of depositing the swath on one side of the rake only. Support of the conveyor belt and positions intermediate shafts 38 may be provided by rotatable stub shafts 38a, as is illustrated in FIG. 4.

In order to shield the crop against the effects of wind as it is deposited by the rake on the conveyor, a cover generally indicated at 41 formed of sheet steel or the like and comprising a unitary back wall portion 41a, and a top cover portion 41b may advantageously be provided.

For the purposes of vertically positioning the rake and conveyor, a parallelogram linkage comprised of links 42 and 43 interconnect pairs of vertically extending frame members 44 to brackets welded to corresponding frame members 45. Preferably, a pair of tension springs 46 (FIGS. 3 and 4) provide upward counterbalancing biasing forces which cause the rake to ride gently over the uneven surfaces of the field. Hydraulic cylinders 48 are each connected to links 43 via a pin 49 and a slotted clevis 50 to lift the rake out of proximity with the ground surface. One or more skids 52 are desirably provided in order to maintain a predetermined minimum distance between the tines and the ground. The pin and slot connection for each clevis comprises a lost motion connection allowing for limited upward motion of the rake should a bump or obstruction be encountered. The arrangement above described allows the rake to float over the field surface, thus avoiding the possibility of the tines picking up dirt and debris as the crop is harvested.

Reference is now made to FIGS. 1, 4 and 5 for an explanation of the hydraulic circuitry used in the preferred embodiment of the invention. As illustrated in FIG. 4, the inclined and horizontally extending portions 14 and 15 of boom 13 are preferably of tubular construction which provides a space which can be conveniently utilized as a reservoir for hydraulic fluid utilized for the control of certain portions of the apparatus. To provide fluid under pressure for operating the hydraulic motors above referred to, a hydraulic pump 54 is mounted on the rear of the tractor in position where it can be driven by the tractor power take off. Pump 54, also shown in FIG. 5, is preferably of the gear type, although other positive displacement pumps may be employed. As is best shown in FIG. 2, an inlet from the hydraulic reservoir within the towing boom 13 is provided via suction hose 56 which is connected to the reservoir at the bottom of the inclined boom section 14. A flexible discharge hose 58 delivers fluid under pressure to the inlets of control valves 60, 62, 64 and 66, which control the support of fluid to, respectively, the motor 40 which operates the reversibly driven conveyor 36, motor 34 for rotation of rake 30, cylinder 48, which controls the lifting of the rake and conveyor system, and cylinder 23, which controls the hitch pivot position. Preferably, valve 60, 62, 64 and 66 are electrically actuated through switches 60a, 62a, 64a and 66a which are mounted in a control box 68 which is mounted at a convenient point on the tractor for actuation by the operator. Each switch activates an appropriate solenoid for shifting its valve from one operating position to another, the solenoid actuators being identified respectively by the reference characters 60b, 62b, 64b and 66b.

Valves 60, 62, 64 and 66 are of conventional construction. Valve 60 is a two-way valve causing rotation of motor 40 in a first direction to drive conveyor 36 in one direction when the valve is in a first position and in the opposite direction to drive the conveyor in the opposite direction when the valve is in the second position, as selected by belt switch 60a.

Rake pick-up valve 62 delivers fluid through a line 62c to drive rake operating motor 34 for rotating rake 30. When switch 62a is in the off position, hydraulic fluid bypass motor 34 is directly returned to the reservoir via a return line 68.

Lift switch 64a causes extension of the pistons of hydraulic cylinders 48 via valve 64 to lift the rake and conveyor sections against the urging of spring 46 when the lift switch 64a is activated. When the lift switch is turned off, the weight of the rake urges the pistons of the hydraulic cylinders 48 downwardly causing an evacuation of fluid to the reservoir via the return line 68.

Hitch pivot valve 66 is a three-position valve which, in a neutral position allows the tractor to pull the equipment directly behind it as is illustrated by the broken line position of the tractor and boom in FIG. 1. The valve is activated by switch 66a by means of solenoid 66b to drive the boom control lever 16 in one direction to cause the boom to pivot and maintain the equipment in a displaced path to the left of the tractor, as viewed in FIG. 1, or alternately when the switch is in the opposite position to maintain the equipment in a path of travel to the right of the tractor.

In use, the operator offsets the rake by action of hitch pivot switch 66a, thereby allowing the tractor to be driven in an offset relationship with respect to the swathed crops, as is illustrated in full lines in FIG. 1. Pick up and consolidation of the swathed crop into a narrower windrow is achieved by activation of pick-up switch 62a which causes rotation of tines 31 by means of motor 34. At the same time, switch 60a should be switched to the position causing rotation of the conveyor towards the right or left hand side of the rake as determined by the operation. The conveyor thus deposits the consolidated swath into a windrow W or W'. Through use of the equipment, harvesting of relatively large swaths into relatively narrow windrows suitable for bailing is achieved with little or no crop damage since neither the tractor nor harvester wheels need be driven over the crop and the crop is not dragged over the ground surface by the rake. In addition, the floating rake support structure substantially avoids any tendency for the rake to dig into the ground, thus reducing the pick up of dirt and debris by the rake.

We claim:

1. A mobile forage crop harvester adapted to be towed behind a prime mover in a laterally offset position relative to the path of travel of the prime mover comprising:

elongated conveyor means extended transversely of the path of travel of said harvester;

ground support means for maintaining said conveyor means in an elevated position with respect to the ground;

crop pick-up means extended along one side of said conveyor means and adapted to pick-up crop and deposit it on said conveyor means;

said conveyor means having end discharge means and means for moving crop picked up by said pick-up means to said end discharge means where it is deposited in a windrow adjacent thereto;

the crop pick-up means and the conveyor means being in an advance position in relation to the harvester ground support means;

prime mover connector means including a towing boom, said towing boom having a first pivot means for pivotal connection of the harvester to the prime mover about a first vertical axis and a second pivotal means rearwardly positioned on the towing boom with respect to the first pivot means for pivotal connection of the towing beam to the ground engaging means about a second vertical axis located relatively rearwardly of the crop pick-up means and the conveyor means; and steerable means interconnecting said boom and said ground engaging means for selectively maintaining said harvester in a path of travel offset from the path of travel of the prime mover.

2. A harvester according to claim 1 wherein said crop pick-up means is a rotary rake.

3. A harvester according to claim 2 wherein said steerable means comprises a steering extension on said boom adjacent said pivotal mounting means and first hydraulically operated means interconnecting the harvester and the boom for pivotally moving the boom about said vertical axis.

4. A harvester according to claim 2 further including means for vertically moving said rotary rake between a crop pick-up position and an elevated position.

5. A harvester according to claim 4 further including resilient means providing an upward counterbalancing biasing force substantially offsetting the weight of said rotary rake for maintaining said rake in a counterbalanced crop pick-up position and actuating means for raising said rake to said elevated position.

6. A harvester according to claim 5 wherein said actuating means includes a lost motion connection, said lost motion connection allowing for limited vertical movement against the biasing force exerted by said resilient means.

7. A harvester according to claim 6 further comprising second actuating means for driving said conveyor in a direction of travel transversely of the harvester and further including selectively operable means reversing the direction of conveyor travel.

8. A harvester according to claim 7 wherein each of said actuating means is a hydraulically operated actuating means, wherein said towing boom is of tubular construction and includes a reservoir for hydraulic fluid within said towing boom for the operation of each of said hydraulic operated actuating means.

9. A towed forage crop harvester adapted to be towed behind an independent prime mover comprising:

conveyor means extending transversely of the path of travel of the harvester;

rotary crop pick-up means extending lengthwise and immediately forwardly of said conveyor means, said pick-up means being positioned to pick up swathed crop and to deposit it on said conveyor means;

conveyor drive means for selectively operating said conveyor means for transferring crop deposited thereon to a windrow on one side or the other of said harvester;

rotary ground engaging means for support of said harvester during movement over the ground, said rotary crop pick-up means being disposed in a position in advance of said ground engaging means in relation to the path of travel of the harvester; and pivotal interconnecting towing means for pivotally connecting the harvester to said independent prime mover adapted to tow the harvester in laterally spaced relationship behind the prime mover, said pivotal interconnecting means including first pivot means positioned forwardly of the conveyor means for pivotal movement relative to the prime mover about a first vertical axis and second pivot means positioned relatively rearwardly of the conveyor means and being pivotally connected to the ground engaging means about a second vertical axis and steering means for selectively maintaining the harvester in a path which is laterally offset with respect to the path of the prime mover.

10. A harvester according to claim 9 wherein said rotary crop pick-up means is a rotary rake.

11. A harvester according to claim 10 wherein said pivotally interconnected towing means includes a towing boom having a first pivotal mounting means interconnecting the towing boom to the prime mover, said first pivotal mounting means allowing for pivotal movement about a vertical axis, said towing boom having a second pivot mounting means offset from the first for interconnecting the boom to the harvester, said second pivotal mounting means allowing for pivotal movement about a vertical axis, said steering means including a steering lever extending from said boom adjacent said second pivotal mounting means and hydraulic actuating means interconnecting the steering lever and the harvester exerting a turning moment on said boom whereby the harvester is maintained in a path which is laterally offset with respect to the path of the prime mover.

12. A harvester according to claim 11 further, including means for vertically moving said rotary crop rake between a crop pick-up position and an elevated position.

13. A harvester according to claim 12 further including resilient means providing an upward counterbalancing biasing which maintains said rotary rake in a crop pick-up position and second hydraulic actuating means for raising said rake to said elevated position.

14. A harvester according to claim 13, further including ground engaging skids mounted in fixed relation to said rotary rake for maintaining a minimum distance between the rake and the ground.

15. A harvester according to claim 9, further including a frame for support of said conveyor means and said rotary pick-up means, resilient suspension means for resiliently mounting said frame on said harvester, said resilient suspension means comprising upper and lower links having spaced apart connection means connecting the links to said harvester and said frame, the link connections on the frame and the harvester being substantially equidistantly spaced and biasing means exerting an upward biasing force on said rotary pick-up means, said conveyor means and said frame, said biasing force being of a magnitude sufficient to counterbalance a substantial portion of the weight carried by said frame and ground contact means for maintaining a predetermined minimum distance between rotary pick-up means and the ground.

16. A mobile forage crop harvester adapted to be towed behind a prime mover in a laterally offset position relative to the path of travel of the prime mover comprising:

elongated conveyor means extended transversely of the path of travel of said harvester;

ground support means for maintaining said conveyor means in an elevated position with respect to the ground;

crop pick-up means extended along one side of said conveyor means and adapted to pick-up crop and deposit it on said conveyor means;

said conveyor means having end discharge means and means for moving crop picked up by said pick-up means to said end discharge means where it is deposited in a windrow adjacent thereto;

the crop pick-up means being in an advance position in relation to the harvester ground support means;

prime mover connector means including a towing boom, for pivotal connection of the harvester to the prime mover including a first vertical pivotal connection means adjacent the prime mover and a second vertical pivotal connection means adjacent the ground support means;

steerable means for selectively maintaining the harvester in a path of travel offset from the path of travel of the prime mover wherein said steerable means comprises a steering extension on said boom adjacent said second pivotal connection means and first actuating means interconnecting the harvester and the boom for pivotally moving the boom about a vertical axis;

means for vertically moving said crop pick-up means between a crop pick-up position and an elevated position;

resilient means providing an upward counterbalancing biasing force substantially offsetting the weight of said crop pick-up means for maintaining said crop pick-up means in a counterbalanced crop pick-up position and second actuating means for raising said crop pick-up means to said elevated position;

said second actuating means including a lost motion connection, said lost motion connection allowing for limited vertical movement of the crop pick-up means against the biasing force exerted by said resilient means.

17. A harvester according to claim 16 further comprising third actuating means for driving said conveyor means in a direction of travel transversely of the harvester and further including selectively operable means reversing the direction of conveyor travel.

18. A harvester according to claim 17 wherein said first, second and third actuating means are hydraulically actuated and wherein said towing boom is of tubular construction and includes a reservoir for hydraulic fluid within said towing boom for the operation of said actuating means.

* * * * *